United States Patent
Yang et al.

(10) Patent No.: US 10,718,721 B2
(45) Date of Patent: Jul. 21, 2020

(54) POWDER SPREADING QUALITY TEST METHOD AND ADDITIVE MANUFACTURING DEVICE

(71) Applicant: XI'AN BRIGHT LASER TECHNOLOGIES CO., LTD., Xi'an (CN)

(72) Inventors: Donghui Yang, Xi'an (CN); Yang Li, Xi'an (CN)

(73) Assignee: XI'AN BRIGHT LASER TECHNOLOGIES CO., LTD., Xi'an (CN)

(*) Notice: Subject to any disclaimer, the term of this patent is extended or adjusted under 35 U.S.C. 154(b) by 0 days.

(21) Appl. No.: 16/266,048

(22) Filed: Feb. 2, 2019

(65) Prior Publication Data
US 2019/0257766 A1    Aug. 22, 2019

Related U.S. Application Data

(63) Continuation of application No. PCT/CN2017/095592, filed on Aug. 2, 2017.

(30) Foreign Application Priority Data

Aug. 2, 2016 (CN) .......................... 2016 1 0624486

(51) Int. Cl.
*G01N 21/95* (2006.01)
*B22F 3/105* (2006.01)
(Continued)

(52) U.S. Cl.
CPC ............. *G01N 21/95* (2013.01); *B22F 3/105* (2013.01); *B22F 3/1055* (2013.01);
(Continued)

(58) Field of Classification Search
USPC .......................... 382/100, 141, 149
See application file for complete search history.

(56) References Cited

U.S. PATENT DOCUMENTS

| | | | | |
|---|---|---|---|---|
| 5,659,630 A | * | 8/1997 | Forslund | G06T 7/001 348/129 |
| 6,815,636 B2 | * | 11/2004 | Chung | G05D 23/1919 219/121.65 |

(Continued)

FOREIGN PATENT DOCUMENTS

| | | |
|---|---|---|
| CN | 1426335 A | 6/2003 |
| CN | 101678613 A | 3/2010 |

(Continued)

OTHER PUBLICATIONS

J.-Y. Jeng et al: "On Line Model Accuracy Inspection of Model Maker Rapid Prototyping Using Vision Technology", The International Journal of Advanced Manufacturing Technology, vol. 17, No. 11, May 9, 2001, pp. 825-834, London. ISSN: 0268-3768, DOI: 10.1 007/s001700170110.

*Primary Examiner* — Ishrat I Sherali

(57) ABSTRACT

Disclosed is a method for testing quality of powder spreading, including: illuminating, after a powder spreading apparatus completes spreading of a single layer of powder, a forming area successively and separately by light sources, and performing photographing twice to obtain two images of powder spreading; synthesizing the two images of powder spreading; determining an overall gray scale of the synthesized image, and if the overall gray scale is consistent, the powder spreading being successful, and if not, processing the synthesized image by using a method of gray scale
(Continued)

threshold segmentation, and marking an area contained in a contour boundary inside the synthesized image as a suspected defect area; and determining whether the powder spreading is successful according to a gray scale value. Also disclosed is a device for testing the quality of powder spreading. The present application realizes a function of testing the quality of powder spreading.

7 Claims, 4 Drawing Sheets

(51) Int. Cl.
*G01N 21/84* (2006.01)
*G01N 21/88* (2006.01)
*G06T 7/00* (2017.01)
*B33Y 10/00* (2015.01)
*B33Y 30/00* (2015.01)

(52) U.S. Cl.
CPC ..... *G01N 21/8422* (2013.01); *G01N 21/8851* (2013.01); *G06T 7/0004* (2013.01); *B22F 2003/1056* (2013.01); *B22F 2003/1057* (2013.01); *B33Y 10/00* (2014.12); *B33Y 30/00* (2014.12); *G01N 2021/8887* (2013.01); *G06T 2207/10016* (2013.01); *G06T 2207/10152* (2013.01); *Y02P 10/295* (2015.11)

(56) References Cited

U.S. PATENT DOCUMENTS

| | | | |
|---|---|---|---|
| 9,718,129 B2* | 8/2017 | Ljungblad | B29C 64/153 |
| 10,144,063 B2* | 12/2018 | Ljungblad | B32B 15/013 |
| 10,183,329 B2* | 1/2019 | Gunther | B29C 64/112 |
| 2006/0126914 A1 | 6/2006 | Ishikawa | |
| 2009/0152771 A1 | 6/2009 | Philippi et al. | |
| 2015/0165683 A1 | 6/2015 | Cheverton et al. | |
| 2015/0283610 A1 | 10/2015 | Ljungblad et al. | |
| 2016/0098824 A1 | 4/2016 | Fry et al. | |
| 2016/0236279 A1 | 8/2016 | Ashton et al. | |
| 2018/0154480 A1* | 6/2018 | Bai | B23K 26/082 |
| 2018/0272613 A1* | 9/2018 | Cieszynski | B29C 64/268 |
| 2018/0347969 A1* | 12/2018 | Snelling, Jr. | G01B 11/002 |
| 2019/0255614 A1* | 8/2019 | Madigan | B23K 26/03 |
| 2019/0353569 A1* | 11/2019 | Godfrey | B22F 3/008 |

FOREIGN PATENT DOCUMENTS

| | | | | |
|---|---|---|---|---|
| CN | 104690269 A | 6/2015 | | |
| CN | 104853901 A | 8/2015 | | |
| CN | 105150546 A | 12/2015 | | |
| CN | 105588845 A | 5/2016 | | |
| CN | 105745060 A | 7/2016 | | |
| CN | 106312062 A | 1/2017 | | |
| DE | 102011009624 A1 | 8/2012 | | |
| DE | 102013214320 | * | 7/2013 | B22F 3/1055 |
| DE | 102013214320 A1 | 1/2015 | | |
| EP | 3002109 A1 | 4/2016 | | |

* cited by examiner

POWDER SPREADING QUALITY TEST METHOD AND ADDITIVE MANUFACTURING DEVICE

CROSS-REFERENCE TO RELATED APPLICATIONS

This application is a continuation of International Application No. PCT/CN2017/095592, filed on Aug. 2, 2017, which claims priority to Chinese Patent Application No. 201610624486.5, filed on Aug. 2, 2016. The disclosures of the aforementioned applications are hereby incorporated by reference in their entireties.

TECHNICAL FIELD

The present application belongs to a technical field of additive manufacturing, and particularly relates to a method for testing a quality of powder spreading and an additive manufacturing device.

BACKGROUND

As an additive manufacturing technology based on a powder spreading method, SLM (selective laser melting) technology is a technology that metal powder is completely melted under a thermal action of a laser beam and molded by cooling and solidification. The technology can transform a design idea into a physical model with certain functions quickly, directly and accurately. Compared with traditional processing methods, the SLM can shorten a product design and manufacturing cycle, promote competitiveness of enterprises, enhance profitability of enterprises, and establish a brand-new product development mode for industrial product designers and developers.

A powder spreading apparatus of an existing SLM device mainly consists of a powder feeding chamber, a recycling chamber, a scraper and a bracket. The specific process is: spreading, by the scraper, a layer of powder material on an upper surface of a formed part; scanning, by a beam, a cross-sectional contour of the layer; sintering the layer, and bonding the sintered layer with the formed portion below. When the sintering of one layer is completed, a workbench is lowered by a thickness of one layer, and then the scraper spreads a layer of powder again to perform sintering of a new layer of section until the entire model is completed.

When a part is processed using an SLM device, precision of powder spreading by a powder spreading apparatus directly affects the forming quality of the part. If a surface is uneven at the time of powder spreading, the corresponding area of the part will form projection and depression. Adding layer upon layer, It is most likely to cause a damage to the part. Even if the processing is completed, there will also exit problems such as low precision. Most of the existing SLM devices are incapable of testing the performance of powder spreading, and as a result, it is difficult to ensure the precision of powder spreading which will affect the forming quality of the part.

SUMMARY

Technical Problem

The object of the present application is to provide a method for testing the quality of powder spreading. The method detects the quality of powder spreading after each powder spreading, which solves a problem that it is easy to cause a damage to a part and difficult to ensure precision of powder spreading as the existing powder spreading method does not test the performance of powder spreading.

Another object of the present application is to provide an apparatus for testing the quality of powder spreading.

Technical Solutions

The technical solution adopted by the present application is a method for testing the quality of powder spreading, including the following steps:

S1: illuminating, after a powder spreading apparatus completes spreading of a single layer of powder, a forming area successively and separately by light sources symmetrically disposed on two sides of the forming area perpendicular to a powder spreading direction, and photographing, by a photographing apparatus located above the forming area, a powder spreading surface separately illuminated by the light source on one side, to obtain two images of powder spreading;

S2: synthesizing the two images of powder spreading obtained in S1;

S3: determining an overall gray scale of the synthesized image, and if the overall gray scale of the synthesized image is consistent, the powder spreading being successful, and if not, turning to S4;

S4: processing the synthesized image by using a method of gray scale threshold segmentation to obtain a gray scale threshold of the synthesized image, extracting a contour boundary inside the synthesized image, and marking an area contained in the contour boundary as a suspected defect area; and S5: determining whether the powder spreading is successful according to a gray scale value of the suspected defect area.

In the above method, the method for determining whether the powder spreading is successful is: if the suspected defect area includes an area of which a gray scale value is greater than the gray scale threshold, the powder spreading fails; otherwise, the powder spreading is successful.

The gray scale threshold segmentation method is a maximum between-class variance method.

The method is further characterized in:

further, determining, after the powder spreading fails, a cause of failure of the powder spreading according to distribution of the suspected defect area. If the suspected defect area is a continuous line shape or strip shape, the failure of the powder spreading is caused by a scraper. If the suspected defect area contains a plurality of dispersed areas, it is first determined whether the failure of the powder spreading is caused by an abnormality of a powder supply system.

The method for determining whether the failure of the powder spreading is caused by the abnormality of the powder supply system is: performing, by the powder supply system, a powder falling; capturing, by the photographing apparatus located above the forming area, a stacking image of falling powder; and calculating an amount of the falling powder according to the stacking image, where if the calculated amount of the falling powder is less than a preset amount of a single powder falling, it indicates that there is an abnormality in the powder supply system.

Another technical solution of the present application is an additive manufacturing device for the above testing method, including: light sources symmetrically disposed on two sides of a forming chamber perpendicular to a powder spreading direction, and a photographing apparatus located above a forming area, the light sources and the photographing apparatus all being connected to a computer.

The photographing apparatus is a camera.

The light sources are LED lights.

Beneficial Effects

The present application has beneficial effects that the method of the present application implements a function of testing the quality of powder spreading on an additive manufacturing device, and can spread the powder again when the powder spreading does not satisfy requirements, thereby ensuring the precision of the powder spreading, and improving the forming quality of a part. Meanwhile, the method also automatically analyzes a cause of failure of the powder spreading, thereby improving the degree of automation of the device. Featured with a simple structure and high degree of automation, the device can complete a powder spreading testing operation efficiently.

BRIEF DESCRIPTION OF DRAWINGS

FIG. 5a illustrates a dispersed area, FIG. 5b illustrates a highlighted area, FIG. 5c illustrates a line-shaped or strip-shaped area, and FIG. 5d illustrates an area including both a dispersed area and a highlighted area.

In the figures, 1 is a scraper, 2 is a powder supply system, 3 is a forming area, 4 is a powder collecting chamber, 5 is a part, 6 is an LED light, 7 is a camera, 8 is a forming chamber, 9 is a computer.

DETAILED DESCRIPTION

The present application will be further described in detail below with reference to the drawings and specific embodiments, however, the present application is not limited to the embodiments.

Figure 1:
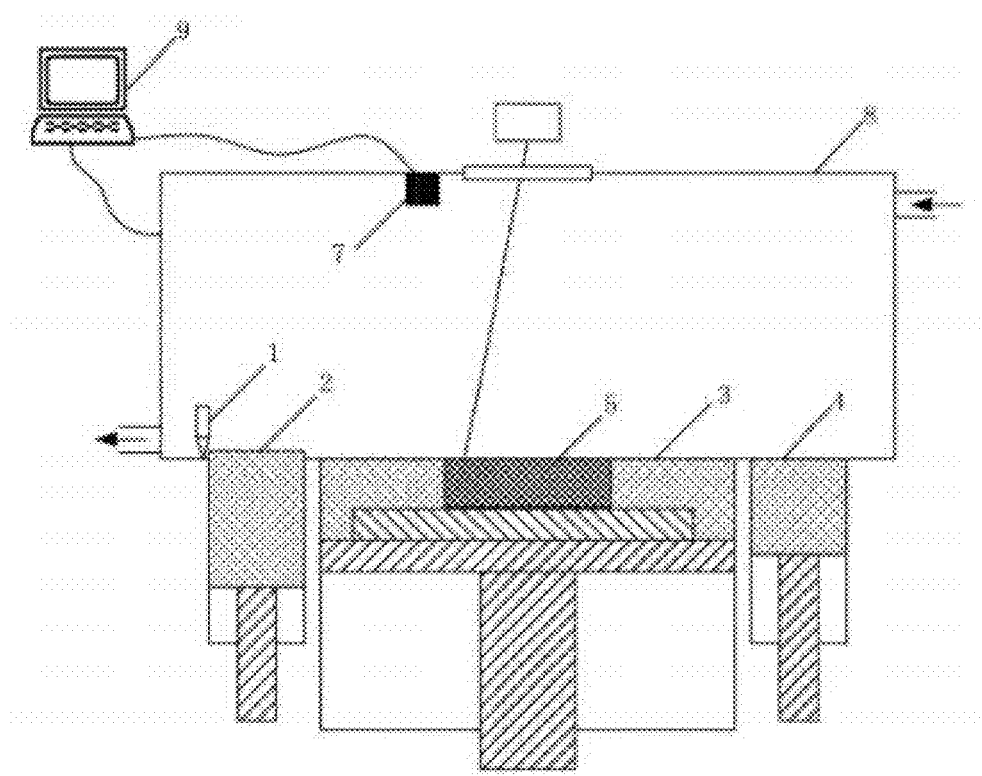
FIG. 1 is a schematic structural diagram of an SLM device for testing the quality of powder spreading according to the present application.
Figure 2:
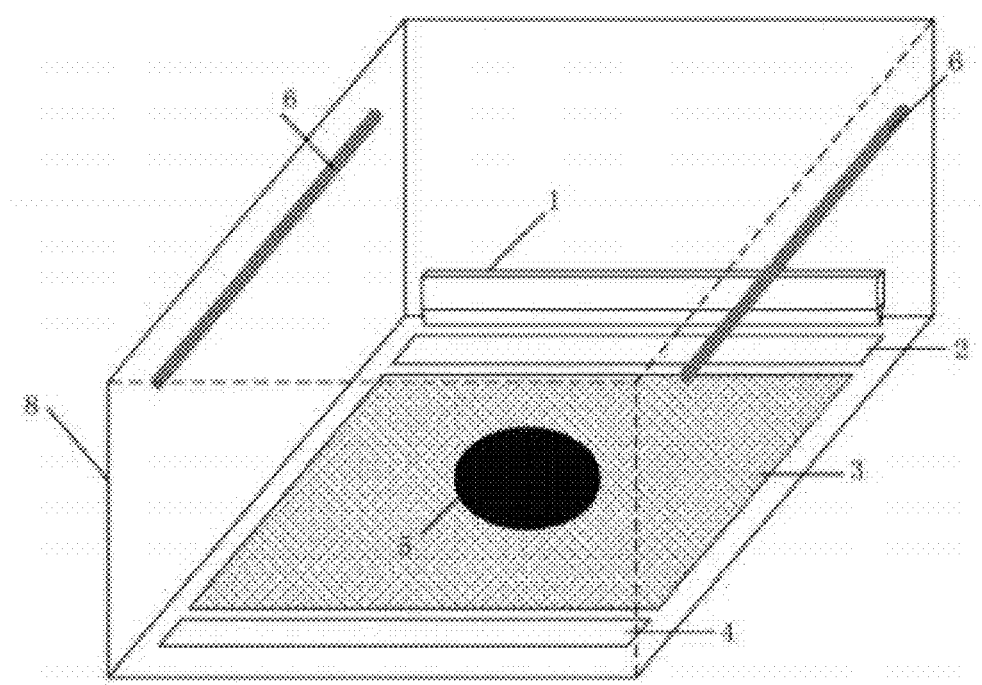
FIG. 2 is a schematic structural diagram of a forming cylinder of an SLM device for testing the quality of powder spreading according to the present application.

A device used in the method of the present application is shown in FIGS. 1 and 2, in which an LED light 6 is mounted on each of two inner walls of a forming chamber 8 of an SLM device perpendicular to a powder spreading direction, and a camera 7 is mounted above a forming area 3, the LED light 6 and the camera 7 being all connected to a computer 9 that controls forming.

A method for testing the quality of powder spreading by the device is: controlling, after powder spreading is completed each time, by the computer 9, the two LED lights 6 to be turned on successively and separately, to illuminate the forming area 3 respectively, and photographing, by the camera 7, the forming area 3 once when each of the LED lights is turned on, to obtain a total of two images of powder spreading; synthesizing and processing, by the computer 9, the two images of powder spreading; determining an overall gray scale of the synthesized image, and if the overall gray scale of the synthesized image is consistent, the powder spreading being successful, and if inconsistent, processing the synthesized image by using a method of gray scale threshold segmentation, extracting a contour boundary inside the synthesized image, and marking an area contained in the contour boundary as a suspected defect area; and determining whether the powder spreading is successful according to a gray scale value of the suspected defect area.

Figure 3:
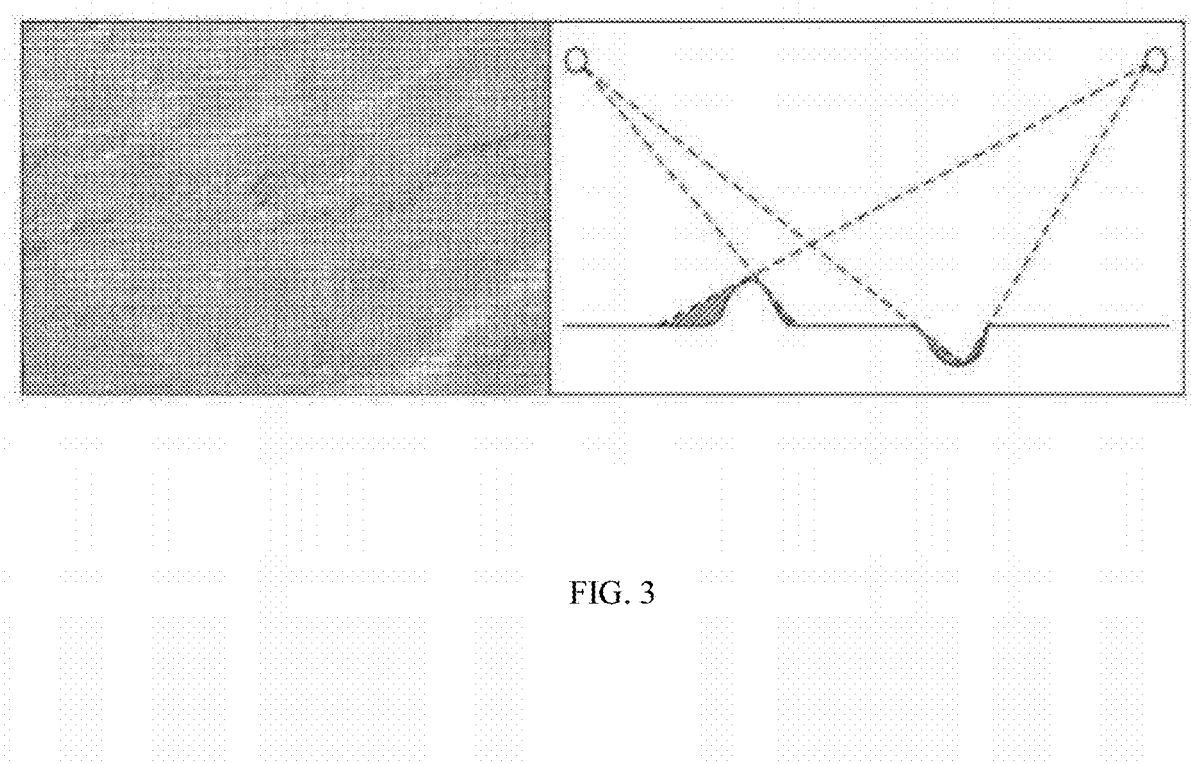
FIG. 3 is a principle diagram of a method for testing the quality of powder spreading according to the present application.

The principle of the method is: when a powder spreading surface is uneven, two beams of light fall to the powder spreading surface from different directions, and a shadow is formed in the uneven area, as shown in FIG. 3, and a gray scale value of the shadow area would be greater than that of the surrounding areas. A computer synthesizes images of the powder spreading surface under the single light respectively, to obtain a clear image of the powder spreading surface after gray scale processing. Then, according to a gray scale value of the synthesized image, it is recognized whether there is a defect in the powder spreading surface, and it can be determined whether the current powder spreading layer satisfies precision requirements, thereby ensuring the quality of powder spreading of a forming area, and further, guaranteeing the forming quality of a part by controlling the quality of powder spreading.

Figure 4:
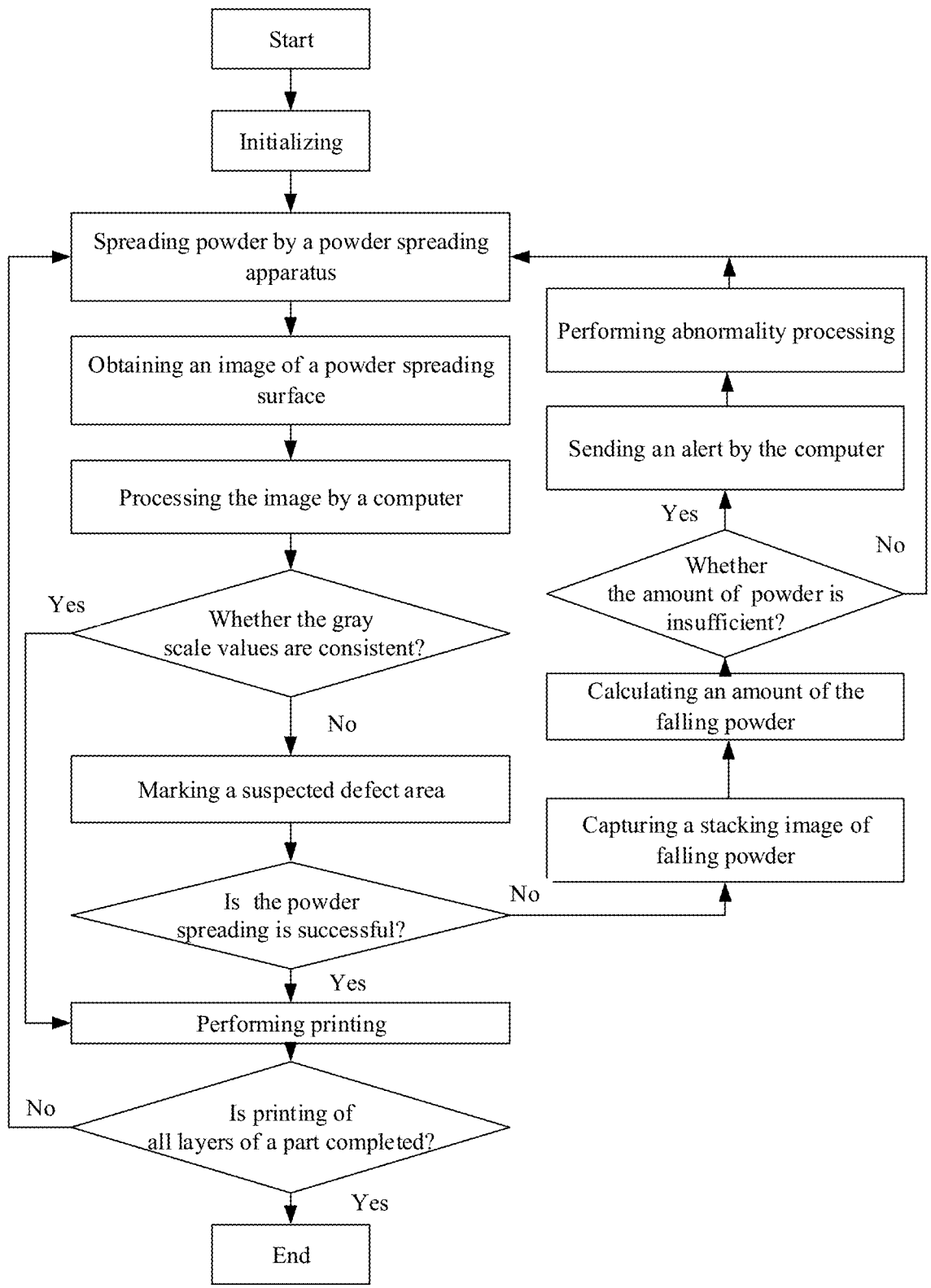
FIG. 4 is a schematic flow chart of a method for testing the quality of powder spreading according to the present application.

The method is as shown in FIG. 4, and is specifically implemented in the following steps.

Step 1: a powder spreading apparatus performs powder spreading.

In a forming chamber 8 of an SLM device, a scraper 1 spreads a powder of a powder supply system 2 on a forming area 3 for processing a part 5, and excess powder enters a powder collecting chamber 4 to complete powder spreading of a current layer.

Step 2: an image of a powder spreading surface is obtained.

After the powder spreading of the current layer is completed, a computer 9 controls two LED lights 6 to be turned on successively and separately, and a camera 7 captures an image of a powder spreading surface of the entire forming area under the illumination of a single light respectively to obtain two images, and transmits the two images to the computer.

Step 3: the image is processed, and whether the powder spreading is successful is determined.

The computer synthesizes and processes the two images to obtain a final image of the powder spreading surface for testing the quality of powder spreading of the current layer. Details are as follows.

(1) The computer synthesizes the two images to obtain a synthesized image of the powder spreading surface.

(2) The computer extracts gray scale values of points of the synthesized image of the powder spreading surface, and if the gray scale values of the points are all the same, it indicates that the powder spreading is successful; if not, it turns to (3).

(3) The synthesized image is processed by using a method of gray scale threshold segmentation to obtain a gray scale threshold of the synthesized image, a contour boundary inside the synthesized image is extracted, and an area contained in the contour boundary is marked as a suspected defect area; and the gray scale threshold segmentation method is a maximum between-class variance method.

Figure 5A:
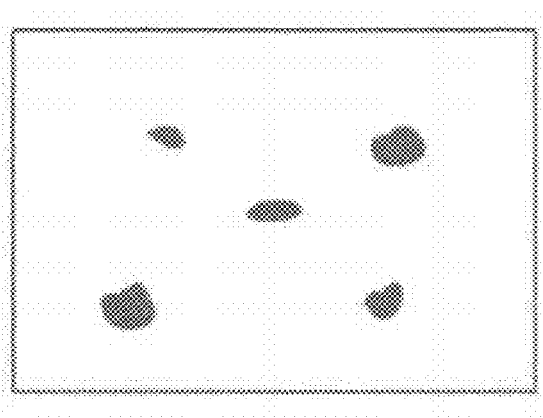
FIGS. 5a-5d are schematic diagrams of different suspected defect areas, where
Figure 5B:
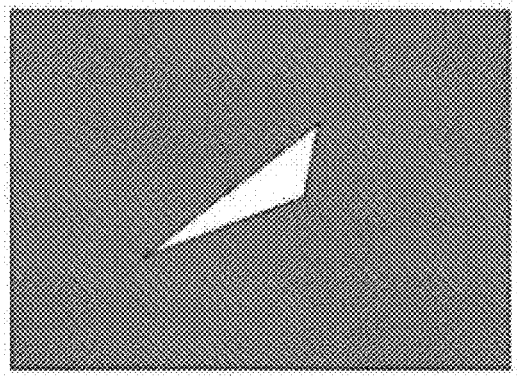
Figure 5C:
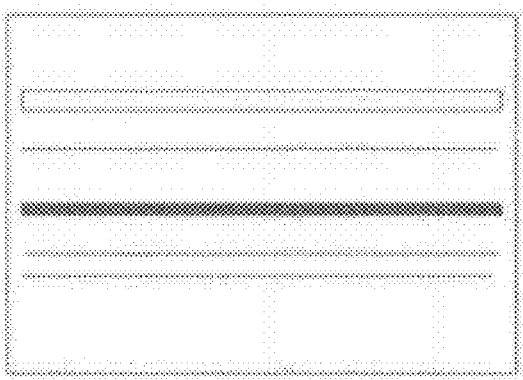
Figure 5D:
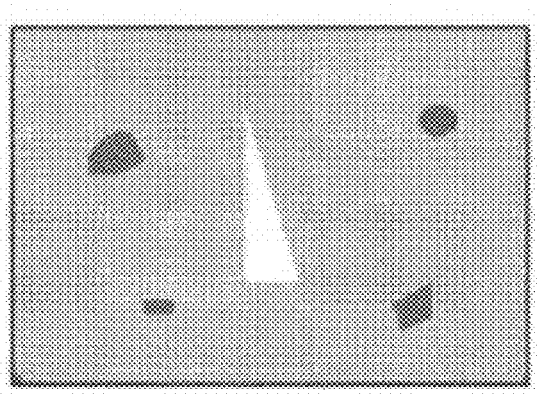

(4) The suspected defect area includes a defect area due to the failure of the powder spreading, and also includes a highlighted area which may be slightly higher in brightness than the other areas due to powder spreading of a sintered area of the upper layer. If the suspected defect area is a defect area, its gray scale value is greater than the gray scale threshold of the image, and the computer determines that the powder spreading fails, as shown in FIGS. 5a and 5c; if the suspected defect area is a highlighted area, its gray scale value is smaller than the gray scale threshold of the image, and the computer determines that the powder spreading is successful, as shown in FIG. 5b; if the suspected defect area not only includes a defect area but also a highlighted area, it includes an area of which a gray scale value is greater than the gray scale threshold of the image, and the computer determines that the powder spreading fails, as shown in FIG. 5d.

Therefore, in general, if the suspected defect area includes an area of which a gray scale value is greater than the gray scale threshold calculated by the method of gray scale threshold segmentation, the powder spreading fails, and the powder is required to be spread again until the powder spreading is successful; otherwise, the powder spreading is successful.

According to the above determination results, if the powder spreading is successful, the current layer is printed; if the powder spreading fails, a cause of failure is found; and then steps 1-3 are repeated, the powder is spread again and the quality of the powder spreading is tested until the powder spreading of the current layer is successful and printing is completed. In the same way, powder spreading, powder spreading test and printing are performed layer by layer until the printing of the entire part is completed.

Figure 6:
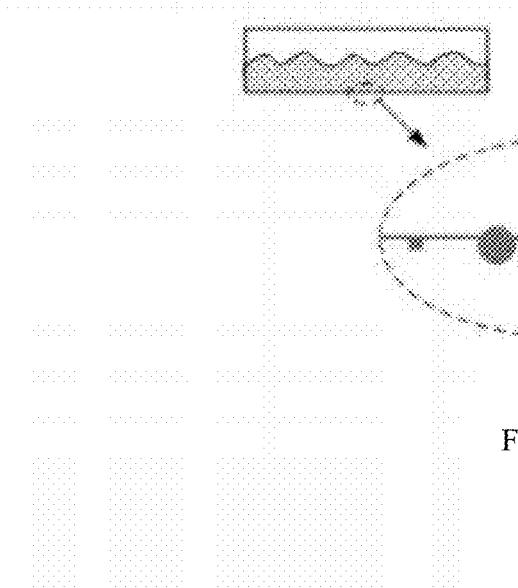
FIG. 6 is a schematic diagram of a surface of a scraper.

Further, after the powder spreading fails, a cause of failure of the powder spreading is determined according to distribution of the suspected defect area. Details are as follows.

a) If the suspected defect area is a continuous line shape or strip shape, as shown in FIG. 5b, the failure of the powder spreading is caused by a scraper; it indicates that there may be a large powder particle on the scraper surface or a gap in the scraper, as shown in FIG. 6, and the scraper is required to be cleaned or replaced before the powder spreading is performed again.

b) If the suspected defect area contains a plurality of dispersed areas, as shown in FIG. 5a, it is first determined whether the failure of the powder spreading is caused by an abnormality of a powder supply system. The determination method is: performing, by the powder supply system, a powder falling; capturing, by the photographing apparatus located above the forming area, a stacking image of falling powder; and calculating an amount of the falling powder according to the stacking image, where if the calculated amount of the falling powder is less than a preset amount of a single powder falling, it indicates that there is an abnormality in the powder supply system, which may be caused by insufficient powder in the powder supply system, or powder stuck in the powder supply system.

The method of the present application realizes a function of testing the quality of powder spreading on an SLM device, and can spread the powder again when the powder spreading does not satisfy requirements, thereby ensuring the precision of the powder spreading, and improving the forming quality of a part; and meanwhile, the method also automatically analyzes a cause of failure of the powder spreading, thereby improving the degree of automation of the device.

The above description of the present application is only a part of the embodiments, but the present application is not limited to the specific embodiments described above. The above detailed embodiments are illustrative and not intended to be limiting. All of the specific developments made with apparatuses and methods according to the present application are within the protection scope of the present application, without departing from the aim of the present application and the protection scope of the claims.

What is claimed is:

1. A method for testing a quality of powder spreading, comprising the following steps:
    S1: illuminating, after a powder spreading apparatus completes spreading of a single layer of powder, a forming area successively and separately by light sources symmetrically disposed on two sides of the forming area perpendicular to a powder spreading direction, and photographing, by a photographing apparatus located above the forming area, a powder spreading surface separately illuminated by the light source on one side, to obtain two images of powder spreading;
    S2: synthesizing the two images of powder spreading obtained in S1;
    S3: determining an overall gray scale of the synthesized image, and if the overall gray scale of the synthesized image is consistent, the powder spreading being successful, and if not, turning to S4;
    S4: processing the synthesized image by using a method of gray scale threshold segmentation to obtain a gray scale threshold of the synthesized image, extracting a contour boundary inside the synthesized image, and marking an area contained in the contour boundary as a suspected defect area; and
    S5: determining whether the powder spreading is successful according to a gray scale value of the suspected defect area.

2. The method for testing the quality of powder spreading according to claim 1, wherein the method for determining whether the powder spreading is successful is: if the suspected defect area includes an area of which a gray scale value is greater than the gray scale threshold, the powder spreading fails; otherwise, the powder spreading is successful.

3. The method for testing the quality of powder spreading according to claim 1, wherein the gray scale threshold segmentation method is a maximum between-class variance method.

4. The method for testing the quality of powder spreading according to claim 3, comprising: determining, after the powder spreading fails, a cause of failure of the powder spreading according to distribution of the suspected defect area.

5. The method for testing the quality of powder spreading according to claim 4, wherein if the suspected defect area is a continuous line shape or strip shape, the failure of the powder spreading is caused by a scraper.

6. The method for testing the quality of powder spreading according to claim 4, wherein if the suspected defect area contains a plurality of dispersed areas, it is first determined whether the failure of the powder spreading is caused by an abnormality of a powder supply system.

7. The method for testing the quality of powder spreading according to claim 6, wherein the method for determining whether the failure of the powder spreading is caused by the abnormality of the powder supply system is: performing, by the powder supply system, a powder falling; capturing, by the photographing apparatus located above the forming area, a stacking image of falling powder; and calculating an amount of the falling powder according to the stacking image, wherein if the calculated amount of the falling powder is less than a preset amount of a single powder falling, it indicates that there is an abnormality in the powder supply system.

* * * * *